US009032426B2

(12) United States Patent
Takahashi et al.

(10) Patent No.: US 9,032,426 B2
(45) Date of Patent: May 12, 2015

(54) MEDIUM PROCESSING DEVICE AND FLEXIBLE CABLE

(75) Inventors: Kazunori Takahashi, Nagano (JP); Toshiro Shiomi, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 13/819,967

(22) PCT Filed: Feb. 15, 2012

(86) PCT No.: PCT/JP2012/053445
§ 371 (c)(1),
(2), (4) Date: Feb. 28, 2013

(87) PCT Pub. No.: WO2012/127937
PCT Pub. Date: Sep. 27, 2012

(65) Prior Publication Data
US 2014/0041896 A1    Feb. 13, 2014

(30) Foreign Application Priority Data
Mar. 24, 2011    (JP) ................ 2011-066519

(51) Int. Cl.
*G11B 7/0033* (2006.01)
*H01B 7/32* (2006.01)
*G11B 5/008* (2006.01)
*G11B 5/48* (2006.01)
*G11B 17/04* (2006.01)

(52) U.S. Cl.
CPC ............. *H01B 7/328* (2013.01); *G11B 7/0033* (2013.01); *G11B 17/0408* (2013.01); *G11B 5/00808* (2013.01); *G11B 5/48* (2013.01)

(58) Field of Classification Search
CPC ........ G11B 7/0033; G11B 25/04; G11B 7/24; G11B 17/0408

USPC .................. 360/245.8, 245.9; 720/618, 745; 174/113 R, 117 R, 117 F, 117 FF; 235/492, 380

See application file for complete search history.

(56) References Cited

U.S. PATENT DOCUMENTS

| 5,310,998 A *    | 5/1994 | Okuno ........................ 235/380 |
| 7,699,225 B2 *   | 4/2010 | Horiguchi et al. ............ 235/449 |
| 2011/0062239 A1* | 3/2011 | Lau et al. .................... 235/492 |

(Continued)

FOREIGN PATENT DOCUMENTS

| JP | 2-244414 A | 9/1990 |
| JP | 6-26008 U  | 4/1994 |

(Continued)

OTHER PUBLICATIONS

International Search Report for International Application No. PCT/JP2012/053445, mailed May 7, 2012, with English translation.

*Primary Examiner* — Brian Miller
(74) *Attorney, Agent, or Firm* — Cantor Colburn LLP

(57) ABSTRACT

A medium processing device may include a head which reads or writes data to a recording medium; and a flexible cable which is connected with the head. The flexible cable may be formed in a multilayer structure including a data signal layer formed with a data signal pattern and disconnection detecting signal layers which cover a front face and a rear face of the data signal layer and are formed with a disconnection detecting signal pattern. The flexible cable may also include a terminal connecting part formed with a through hole into which a signal terminal of the head is inserted and a terminal covering part folded to cover the terminal connecting part and fixed to the terminal connecting part.

11 Claims, 5 Drawing Sheets

(56) References Cited

U.S. PATENT DOCUMENTS

2013/0161086 A1* 6/2013 Mayer et al. .................. 174/535
2014/0009878 A1* 1/2014 Takahashi et al. ......... 361/679.4

FOREIGN PATENT DOCUMENTS

| | | |
|---|---|---|
| JP | 2005-136391 A | 5/2005 |
| JP | 2008-293628 A | 12/2008 |

* cited by examiner

MEDIUM PROCESSING DEVICE AND FLEXIBLE CABLE

CROSS REFERENCE TO RELATED APPLICATIONS

This is a U.S. national stage of International Application No. PCT/JP2012/053445, filed on Feb. 15, 2012. Priority under 35 U.S.C. §119(a) and 35 U.S.C. §365(b) is claimed from Japanese Application No. 2011-066519, filed Mar. 24, 2011, the disclosure of which is also incorporated herein by reference.

TECHNICAL FIELD

The present invention relates to a medium processing device structured to perform reading of data recorded in a recording medium and/or writing of data to a recording medium. Further, the present invention relates to a flexible cable used in a medium processing device which is structured to perform reading of data recorded in a recording medium and/or writing of data to a recording medium.

BACKGROUND

Conventionally, a card reader structured to read magnetic data recorded on a card has been widely utilized. In this type of a card reader, for example, magnetic data recorded on a card are read by a magnetic head disposed in a card passage along which the card is passed. Further, conventionally, in an industry where a card reader is utilized, a so-called skimming, that is, an illegal act that a criminal attaches a signal line to the magnetic head or the like and magnetic information recorded on the card is illegally acquired, is becoming a serious problem.

In order to prevent this problem, conventionally, a magnetic head and a flexible cable which are capable of preventing the skimming has been proposed (see, for example, Patent Literature 1). In the Patent Literature 1, a signal terminal of a magnetic head and a flexible cable are connected with each other in the inside of a head case of the magnetic head and resin is filled in the inside of the head case so as to cover the connected portion of the signal terminal with the flexible cable. Further, in the Patent Literature 1, both of an upper face and a lower face of the signal wiring line layer in which a conducting wire through which a data signal is transmitted from the magnetic head is formed are covered by a protective layer in the flexible cable which is connected with the signal terminal. The protective layer is formed with a disconnection detection wiring line having a disconnection detection function and a short circuit detection wiring line.

Therefore, when the technique described in Patent Literature 1 is used, attachment of a skimming signal line to the signal terminal of the magnetic head and to a conducting wire of the flexible cable is prevented and, as a result, the skimming is prevented.

PATENT LITERATURE

[PTL 1] Japanese Patent Laid-Open No. 2008-293628

An end part of a signal terminal of a magnetic head is commonly protruded. On the other hand, in the magnetic head described in Patent Literature 1, the signal terminal is accommodated in an inside of a head case so that the signal terminal and the flexible cable are connected with each other in the inside of the head case. In other words, the magnetic head described in Patent Literature 1 is provided with a special structure. Therefore, the magnetic head is expensive. Further, in the magnetic head described in Patent Literature 1, the flexible cable is required to be connected with the signal terminal in the inside of the head case where the connecting work is hard to be performed and thus the connecting work of the flexible cable with the signal terminal is complicated.

SUMMARY

In view of the problem described above, at least an embodiment of the present invention is to provide a medium processing device which is capable of reducing a cost of a recording and reproducing head that performs reading of data recorded in a recording medium or writing of data to a recording medium, easily performing connecting work of a flexible cable with a signal terminal of the recording and reproducing head, and preventing illegal acquisition of data such as skimming. Further, at least an embodiment of the present invention is to provide a flexible cable which is capable of reducing a cost of a recording and reproducing head that is connected with the flexible cable, easily performing connecting work with a signal terminal of the recording and reproducing head, and preventing illegal acquisition of data such as skimming.

In order to solve the problem, at least an embodiment of the present invention provides a medium processing device including a recording and reproducing head which performs reading of data recorded in a recording medium and/or writing of data to a recording medium, and a flexible cable which is connected with the recording and reproducing head. The flexible cable is formed in a multilayer structure including a data signal layer which is formed with a data signal pattern transmitting data signal from the recording and reproducing head and/or data signal to the recording and reproducing head, and disconnection detecting signal layers which cover a front face and a rear face of the data signal layer and are formed with a disconnection detecting signal pattern transmitting a disconnection detecting signal for detecting disconnection of the disconnection detecting signal pattern. In addition, the flexible cable includes a terminal connecting part which is formed with a through hole into which a signal terminal of the recording and reproducing head is inserted, and a terminal covering part which is folded to cover the terminal connecting part and is fixed to the terminal connecting part.

In the medium processing device in accordance with at least an embodiment of the present invention, the terminal covering part is folded to cover the terminal connecting part, which is formed with a through hole into which the signal terminal of the recording and reproducing head is inserted, and is fixed to the terminal connecting part. Therefore, even when an end part of the signal terminal is exposed to an outer side of the recording and reproducing head, the signal terminal is covered by the terminal covering part. Accordingly, attachment of a signal line for illegal data acquisition to the signal terminal of the recording and reproducing head is prevented. Further, in the flexible cable in accordance with at least an embodiment of the present invention, a front face and a rear face of the data signal layer are covered by the disconnection detecting signal layers which are formed with the disconnection detecting signal pattern. Therefore, when a criminal is trying to attach a signal line for illegal data acquisition to the data signal pattern, the criminal act is detected by utilizing the disconnection detecting signal pattern. Accordingly, attachment of a signal line for illegal data acquisition to the data signal pattern of the flexible cable is prevented. As described above, according to at least an embodiment of the present invention, attachment of a signal line for illegal data acquisition to the signal terminal of the recording and reproducing head and to the data signal pattern is prevented, illegal acquisition of data such as skimming is prevented.

Further, in at least an embodiment of the present invention, even when the end part of the signal terminal is exposed to an outer side of the recording and reproducing head, illegal acquisition of data is prevented. Therefore, even when a normal recording and reproducing head (in other words, a general purpose recording and reproducing head) in which the end part of the signal terminal is exposed to an outer side is used, illegal acquisition of data is prevented. Accordingly, according to at least an embodiment of the present invention, cost of the recording and reproducing head is reduced. Further, according to at least an embodiment of the present invention, even when the end part of the signal terminal is exposed to an outer side of the recording and reproducing head, illegal acquisition of data is prevented and thus connecting work of the flexible cable with the signal terminal is easily performed while preventing illegal acquisition of data.

In at least an embodiment of the present invention, it is preferable that the flexible cable is formed in a long and thin elongated shape in one direction, and the terminal covering part is formed so as to be connected with the terminal connecting part in a longitudinal direction of the flexible cable. According to this structure, in comparison with a case that the terminal covering part is formed so as to be connected with the terminal connecting part in a widthwise direction of the flexible cable, the structure of the flexible cable is simplified.

In at least an embodiment of the present invention, it is preferable that the flexible cable includes an outer side covering part which is formed so as to be connected with the terminal connecting part in a widthwise direction of the flexible cable and is folded to cover the terminal covering part and is fixed to the terminal covering part. According to this structure, an end face of the terminal connecting part and an end face of the terminal covering part in the widthwise direction of the flexible cable are covered by the outer side covering part. Therefore, attachment of a signal line for illegal data acquisition to the signal terminal of the flexible cable from a space between the end face of the terminal connecting part and the end face of the terminal covering part in the widthwise direction of the flexible cable is prevented by the outer side covering part.

In at least an embodiment of the present invention, it is preferable that the flexible cable includes a second outer side covering part which covers the outer side covering part, the outer side covering part is formed so as to be connected with one end of the terminal connecting part in the widthwise direction of the flexible cable, and the second outer side covering part is formed so as to be connected with the other end of the terminal connecting part in the widthwise direction of the flexible cable and is folded to cover the outer side covering part and is fixed to the outer side covering part. According to this structure, the end face of the terminal connecting part and the end face of the terminal covering part are covered by the outer side covering part and the second outer side covering part on both sides in the widthwise direction of the flexible cable. Therefore, attachment of a signal line for illegal data acquisition to the signal terminal from a space between the end face of the terminal connecting part and the end face of the terminal covering part on both sides in the widthwise direction of the flexible cable is prevented by the outer side covering part and the second outer side covering part.

In at least an embodiment of the present invention, it is preferable that the second outer side covering part is fixed to the outer side covering part by soldering. According to this structure, the second outer side covering part is hard to be torn off from the outer side covering part. Therefore, attachment of a signal line for illegal data acquisition to the signal terminal from a space between the end face of the terminal connecting part and the end face of the terminal covering part is prevented effectively.

In at least an embodiment of the present invention, it is preferable that the disconnection detecting signal layer is formed with a first disconnection detecting signal pattern, which is a disconnection detecting signal pattern on an input side for the disconnection detecting signal, and a second disconnection detecting signal pattern which is a disconnection detecting signal pattern on an output side for the disconnection detecting signal, the outer side covering part and the second outer side covering part are formed with lands for connecting the first disconnection detecting signal pattern with the second disconnection detecting signal pattern, the second outer side covering part is fixed to the outer side covering part by soldering the land of the second outer side covering part to the land of the outer side covering part, and the first disconnection detecting signal pattern and the second disconnection detecting signal pattern are connected with each other by soldering the land of the second outer side covering part to the land of the outer side covering part. In this case, when the second outer side covering part is torn off from the outer side covering part, the land of the second outer side covering part is separated from the land of the outer side covering part. Therefore, disconnection of the disconnection detecting signal pattern is detected when the second outer side covering part is torn off from the outer side covering part. Accordingly, a criminal act by a criminal is detected at an early stage.

In at least an embodiment of the present invention, it is preferable that the flexible cable is formed in a long and thin elongated shape in one direction, and the disconnection detecting signal pattern is formed to be folded multiple times in a widthwise direction of the flexible cable. According to this structure, when the disconnection detecting signal layer is cut for trying to attach a signal line for illegal data acquisition to the data signal pattern, the disconnection detecting signal pattern is easily disconnected. Therefore, a criminal act by a criminal is easily detected.

In at least an embodiment of the present invention, it is preferable that the disconnection detecting signal layer is formed with a short circuit detecting signal pattern transmitting a short circuit detecting signal for detecting a short circuit between the disconnection detecting signal pattern and the short circuit detecting signal pattern. According to this structure, in a case that a criminal performs a certain trick on the disconnection detecting signal pattern so as not to function the disconnection detecting signal, the criminal act is detected by the short circuit detecting function of the short circuit detecting signal pattern.

In at least an embodiment of the present invention, it is preferable that the medium processing device includes a connector with which the flexible cable is connected, and the disconnection detecting signal pattern functions to detect detachment of the flexible cable from the connector. According to this structure, in a case that a criminal pulls off the flexible cable from the connector in order to try to attach a signal line for illegal data acquisition to the data signal pattern, the criminal act is detected by the detachment detecting function of the disconnection detecting signal pattern. Therefore, the criminal act by a criminal is detected at an early stage.

In at least an embodiment of the present invention, the recording and reproducing head is, for example, a magnetic head which performs reading of magnetic data and/or writing of magnetic data.

Further, in order to solve the problem, at least an embodiment of the present invention provides a flexible cable which is structured in a multilayer structure including a data signal layer which is formed with a data signal pattern transmitting data signal, and disconnection detecting signal layers which cover a front face and a rear face of the data signal layer and are formed with a disconnection detecting signal pattern transmitting a disconnection detecting signal for detecting disconnection of the disconnection detecting signal pattern. The flexible cable is further includes a terminal connecting part which is formed with a through hole into which a signal terminal of a recording and reproducing head, which performs reading of data recorded in a recording medium and/or writing of data to the recording medium, is inserted, and a terminal covering part which is folded to cover the terminal connecting part and is fixed to the terminal connecting part.

The flexible cable in accordance with at least an embodiment of the present invention is provided with a terminal covering part which is folded to cover the terminal connecting part, in which a through hole to which the signal terminal of the recording and reproducing head is inserted is formed, and is fixed to the terminal connecting part. Therefore, even when the end part of the signal terminal is exposed to an outer side of the recording and reproducing head with which the flexible cable is connected, the signal terminal is covered by the terminal covering part. Accordingly, attachment of a signal line for illegal data acquisition is prevented to the signal terminal of the recording and reproducing head with which the flexible cable is connected. Further, in at least an embodiment of the present invention, a front face and a rear face of the data signal layer in which a data signal pattern is formed are covered by the disconnection detecting signal layer in which a disconnection detecting signal pattern is formed. Therefore, attachment of a signal line for illegal data acquisition to the data signal pattern is prevented. Accordingly, in at least an embodiment of the present invention, illegal acquisition of data such as skimming is prevented.

Further, in at least an embodiment of the present invention, even when the end part of the signal terminal is exposed to an outer side of a recording and reproducing head with which the flexible cable is connected, illegal acquisition of data is prevented and thus, even when a normal recording and reproducing head in which the end part of the signal terminal is exposed to the outer side is used, illegal acquisition of data is prevented. Therefore, according to at least an embodiment of the present invention, cost of the recording and reproducing head with which the flexible cable is connected is reduced. Further, according to at least an embodiment of the present invention, even when the end part of the signal terminal is exposed to an outer side of the recording and reproducing head with which the flexible cable is connected, illegal acquisition of data is prevented and thus, while preventing illegal acquisition of data, connecting work with the signal terminal is performed easily.

As described above, in the medium processing device in accordance with at least an embodiment of the present invention, cost of the recording and reproducing head is reduced while preventing illegal acquisition of data such as skimming, and connecting work of the flexible cable with the signal terminal of the recording and reproducing head is performed easily. Further, in the flexible cable in accordance with at least an embodiment of the present invention, cost of the recording and reproducing head with which the flexible cable is connected is reduced while preventing illegal acquisition of data such as skimming, and connecting work with the signal terminal of the recording and reproducing head is performed easily.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

An embodiment of the present invention will be described below with reference to the accompanying drawings.
(Schematic Structure of Medium Processing Device)

Figure 1:
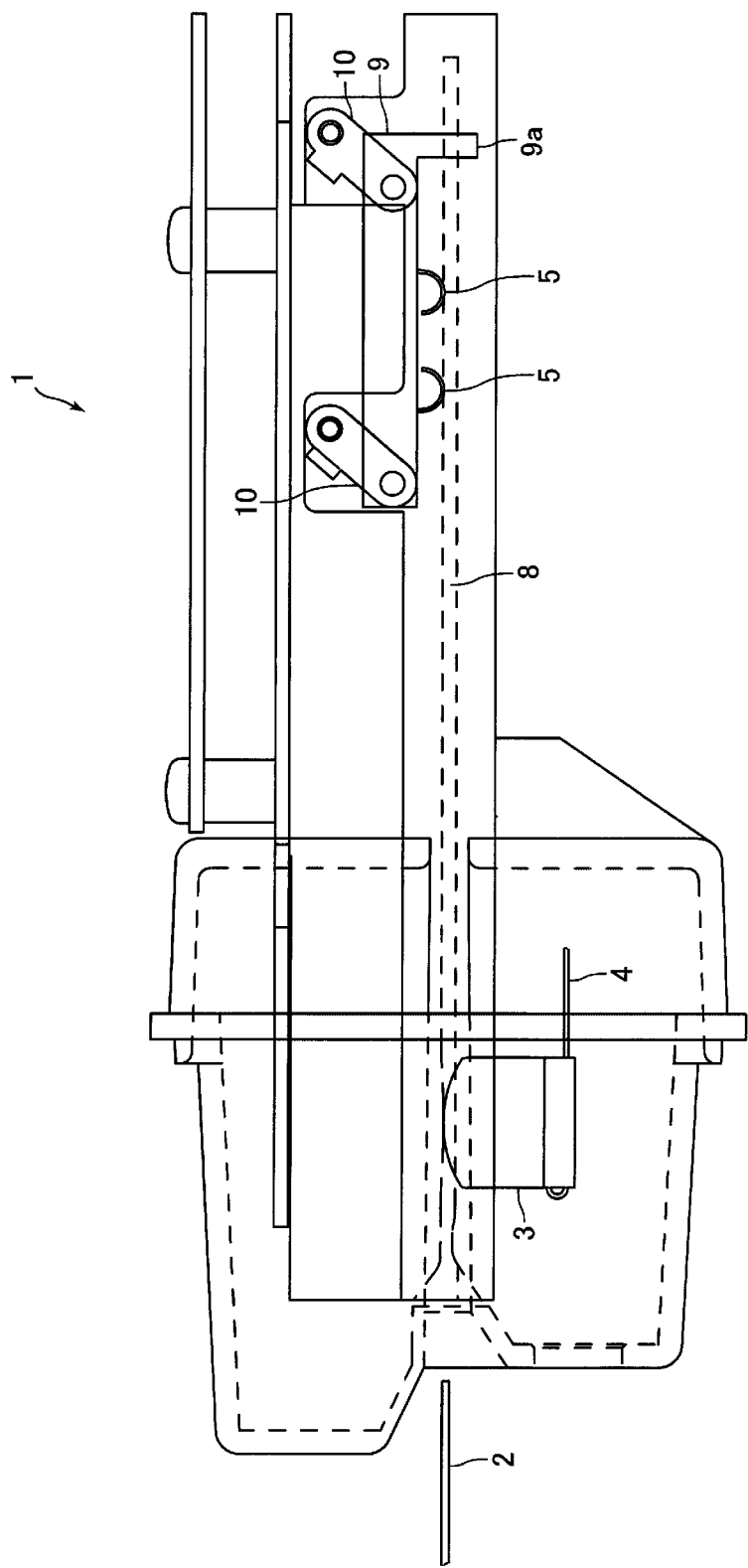
FIG. 1 is an explanatory side view showing a schematic structure of a medium processing device in accordance with an embodiment of the present invention.

FIG. 1 is an explanatory side view showing a schematic structure of a medium processing device 1 in accordance with an embodiment of the present invention.

The medium processing device 1 in this embodiment is a card reader structured to perform reading of data recorded in a card 2, which is a recording medium, and writing of data to a card 2. Specifically, the medium processing device 1 is a so-called dip type card reader in which a user manually inserts a card 2 into an inside of the device and pulls out the card 2 from the inside of the device. The medium processing device 1 is mounted on a predetermined host device and is used.

The medium processing device 1 includes a magnetic head 3 as a recording and reproducing head for performing reading of magnetic data recorded on a card 2, and a flexible cable 4 which is connected with the magnetic head 3. Further, the medium processing device 1 includes IC contacts 5 which are to be contacted with contact terminals formed on the card 2 to exchange data. A card passage 8 where the card 2 is passed is formed in an inside of the medium processing device 1.

The card 2 is, for example, a rectangular card made of vinyl chloride whose thickness is about 0.7-0.8 mm. A magnetic stripe in which magnetic data are to be recorded is formed on one face of the card 2. Further, contact terminals with which the IC contacts 5 are contacted are formed on the other face of the card 2. In other words, a card 2 in this embodiment is a contact type IC card with a magnetic stripe. In accordance with an embodiment of the present invention, an antenna for communication may be incorporated into the card 2. In other words, the card 2 may be a non-contact type IC card with a magnetic stripe. Further, the card 2 may be a PET (polyethylene terephthalate) card whose thickness is about 0.18-0.36 mm or may be a paper card having a predetermined thickness.

The magnetic head 3 is disposed so that its magnetic gap is exposed in the card passage 8. In this embodiment, when a user inserts a card 2 into an inside of the device or, when the user pulls out the card 2 inserted into the inside of the device, magnetic data of the card 2 is read by the magnetic head 3. One end of the flexible cable 4 is connected with the magnetic head 3 and the other end of the flexible cable 4 is connected with a connector (not shown) which is provided in a host device on which the medium processing device 1 is mounted. The connector is mounted on a region of the host device where security is assured. The structure of the magnetic head 3 and the flexible cable 4 will be described below.

The IC contacts 5 are disposed on a rear end side of the medium processing device 1 and are fixed to an IC contact block 9. Lever members 10 and a tension coil spring (not shown) urging the IC contact block 9 toward a side of insertion of a card 2 are attached to the IC contact block 9. In this embodiment, when a card 2 is abutted with a card abutting part 9a which is formed at a rear end of the IC contact block 9, the lever members 10 are turned and the IC contact block 9 is moved so that the IC contacts 5 are contacted with the contact terminals formed on the card 2. When the IC contacts 5 are contacted with the contact terminals of the card 2, data are exchanged between the medium processing device 1 and the card 2. Further, when the card 2 is pulled out in this state, the IC contact block 9 is moved by an urging force of the tension coil spring and the IC contacts 5 are retreated from the card passage 8.

(Structure of Magnetic Head and Flexible Cable)

Figure 2:
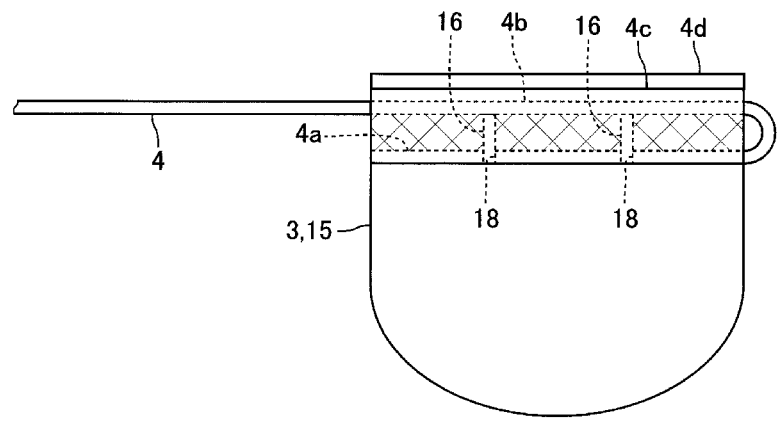
FIG. 2 is an explanatory side view showing a connected portion of a magnetic head with a flexible cable shown in FIG. 1.
Figure 3:
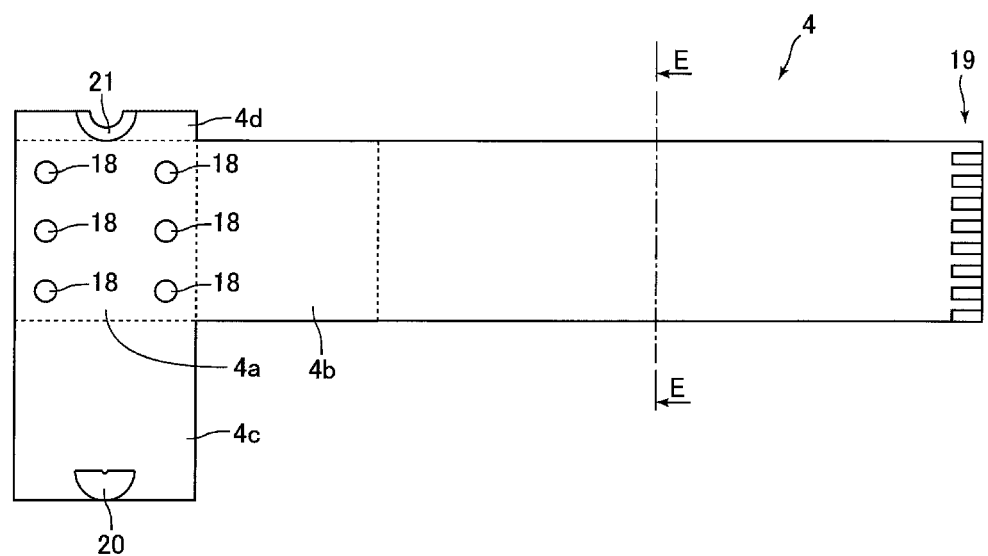
FIG. 3 is a developed view showing the flexible cable in FIG. 1.
Figure 5:
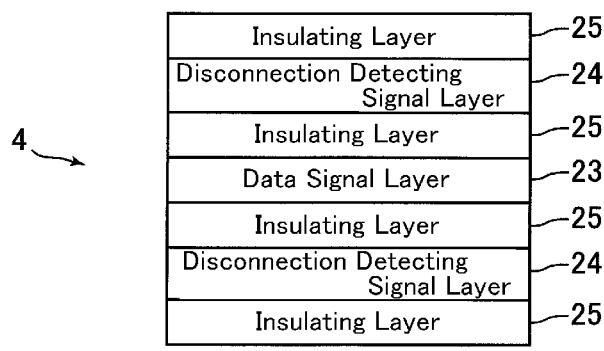
FIG. 5 is a cross-sectional view showing the "E-E" cross section in FIG. 3.
Figure 6:
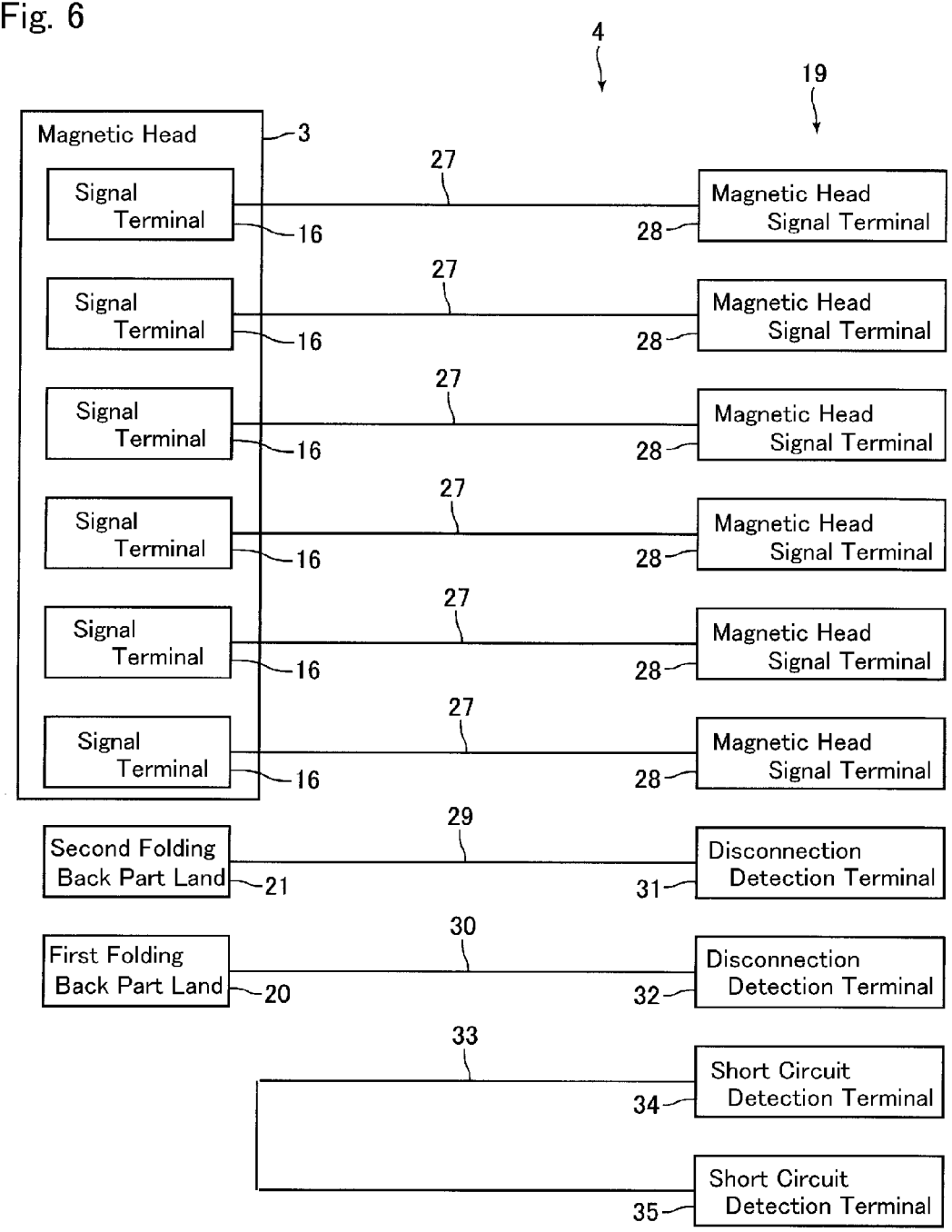
FIG. 6 is a block diagram showing a connecting relationship of signal patterns in an inside of the flexible cable shown in FIG. 1.

FIG. 2 is an explanatory side view showing a connected portion of the magnetic head 3 with the flexible cable 4 shown in FIG. 1. FIG. 3 is a developed view showing the flexible cable 4 in FIG. 1. FIGS. 4(A) through 4(D) are perspective views showing an attaching procedure of the flexible cable 4 to the magnetic head 3 shown in FIG. 1. FIG. 5 is a cross-sectional view showing the "E-E" cross section in FIG. 3. FIG. 6 is a block diagram showing a connecting relationship of signal patterns in an inside of the flexible cable 4 shown in FIG. 1.

The magnetic head 3 includes a core, a coil and a bobbin not shown. The core, the coil and the bobbin are accommodated in the inside of a head case 15. End parts of the coil are electrically connected and fixed to one end sides of signal terminals 16. The core, the coil, the bobbin and the one end sides of the signal terminals 16 are covered with resin which is filled in the inside of the head case 15. The magnetic head 3 in this embodiment is a three-channel type magnetic head and is provided with six signal terminals 16. The other end sides of the signal terminals 16 are protruded from the head case 15 and are exposed to an outer side of the magnetic head 3.

The flexible cable 4 is formed in an elongated shape which is long and thin in one direction. The flexible cable 4 is, as shown in FIG. 2 through FIG. 4(D), provided with a terminal connecting part 4a where through holes 18 into which the signal terminals 16 are inserted are formed, a turning back part 4b as a terminal covering part which is folded to cover the terminal connecting part 4a and is fixed to the terminal connecting part 4a, a first folding back part 4c as an outer side covering part which is turned back so as to cover the turning back part 4b and is fixed to the turning back part 4b, and a second folding back part 4d as a second outer side covering part which is turned back so as to cover the first folding back part 4c and is fixed to the first folding back part 4c. Further, one end side in a longitudinal direction of the flexible cable 4 is formed with a connecting terminal part 19 which is connected with the connector of the host device.

The terminal connecting part 4a is formed on the other end side in the longitudinal direction of the flexible cable 4. The terminal connecting part 4a is formed with six through holes 18 so as to correspond to the six signal terminals 16 provided in the magnetic head 3. The turning back part 4b is formed so as to be connected with the terminal connecting part 4a in the longitudinal direction of the flexible cable 4. In a widthwise direction of the flexible cable 4 which is perpendicular to the longitudinal direction of the flexible cable 4, a width of the turning back part 4b is equal to a width of the terminal connecting part 4a. Further, an area of the turning back part 4b is equal to an area of the terminal connecting part 4a.

The first folding back part 4c and the second folding back part 4d are formed so as to be connected with the terminal connecting part 4a in the widthwise direction of the flexible cable 4. Specifically, the first folding back part 4c is formed so as to be connected with one end of the terminal connecting part 4a in the widthwise direction of the flexible cable 4 and the second folding back part 4d is formed so as to be connected with the other end of the terminal connecting part 4a in the widthwise direction of the flexible cable 4. In other words, the flexible cable 4 is formed in a roughly "T"-shape. The first folding back part 4c is formed with a land 20 and the second folding back part 4d is formed with a land 21.

In the longitudinal direction of the flexible cable 4, widths of the first folding back part 4c and the second folding back part 4d are equal to a width of the terminal connecting part 4a. Further, an area of the first folding back part 4c is equal to an area of the terminal connecting part 4a. On the other hand, an area of the second folding back part 4d is smaller than the area of the terminal connecting part 4a. For example, the area of the second folding back part 4d is about ⅙ of the area of the terminal connecting part 4a.

Figure 4A:
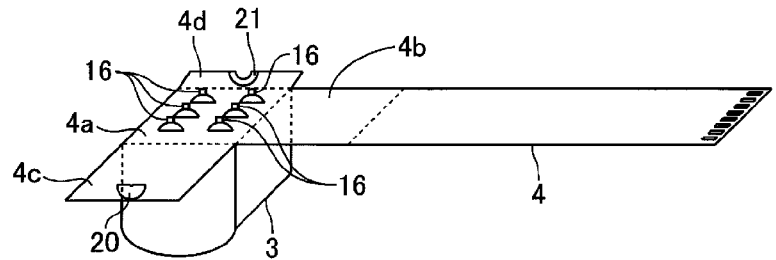
FIGS. 4(A) through 4(D) are perspective views showing an attaching procedure of the flexible cable to the magnetic head shown in FIG. 1.
Figure 4B:
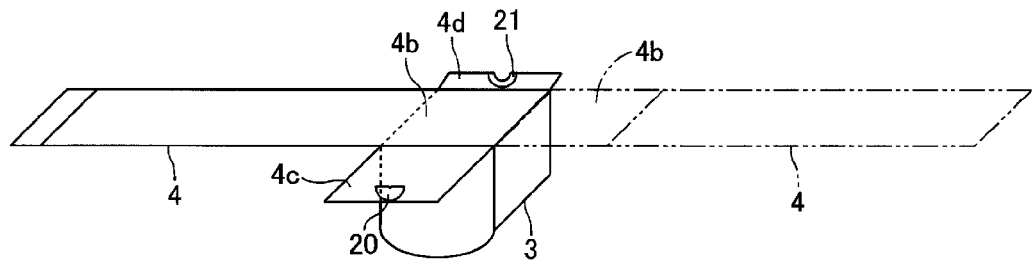

The terminal connecting part 4a is, as shown in FIG. 4(A), fixed to a terminal face of the magnetic head 3 from which the signal terminals 16 are protruded. Specifically, in a state that the signal terminals 16 are inserted into the through holes 18, the terminal connecting part 4a is fixed to the terminal face of the magnetic head 3 by adhesion. Further, the through hole 18 and the signal terminal 16 are soldered each other. The turning back part 4b is, as shown in FIG. 4(B), folded to cover the terminal connecting part 4a and the end parts of the signal terminals 16 from an upper side in FIG. 4(B) and is fixed to the terminal connecting part 4a. Further, the turning back part 4b is fixed to the terminal connecting part 4a by adhesion.

Figure 4C:
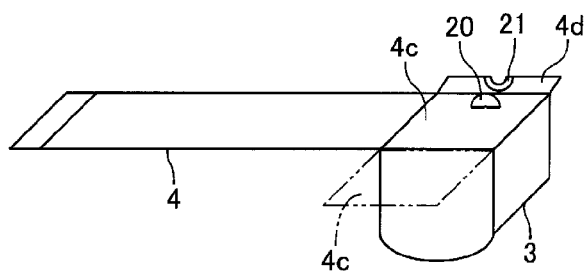
Figure 4D:
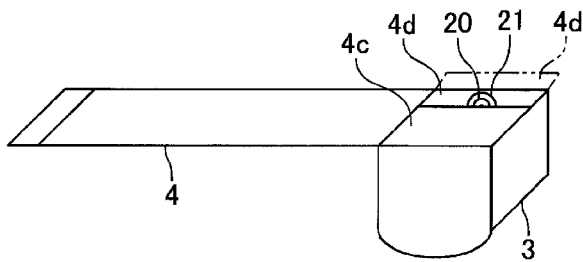

The first folding back part 4c is, as shown in FIG. 4(C), folded to cover the turning back part 4b from the upper side in FIG. 4(C) and is fixed to the turning back part 4b. Further, the first folding back part 4c is fixed to the turning back part 4b by adhesion. The second folding back part 4d is, as shown in FIG. 4(D), folded to cover a part of the first folding back part 4c from the upper side in FIG. 4(D) and is fixed to the first folding back part 4c. When the second folding back part 4d is folded, the land 21 of the second folding back part 4d is overlapped with the land 20 of the first folding back part 4c. In this embodiment, the land 21 is soldered to the land 20 and, as a result, the second folding back part 4d is fixed to the first folding back part 4c.

Further, the flexible cable 4 is, as shown in FIG. 5, formed in a multilayer structure which is provided with a data signal layer 23, disconnection detecting signal layers 24 and insulating layers 25. In the flexible cable 4, the insulating layer 25, the disconnection detecting signal layer 24, the insulating layer 25, the data signal layer 23, the insulating layer 25, the disconnection detecting signal layer 24 and the insulating layer 25 are laminated in this order from a front face of the flexible cable 4 to its rear face. In other words, a front face and a rear face of the data signal layer 23 are covered by the disconnection detecting signal layers 24 through the insulating layers 25.

The data signal layer 23 is formed with data signal patterns 27 (see FIG. 6) for transmitting a data signal from the magnetic head 3 to the host device on which the medium processing device 1 is mounted. In this embodiment, six data signal patterns 27 are formed in the data signal layer 23 so as to correspond to the six signal terminals 16. One end of the data signal pattern 27 is electrically connected with the through hole 18. Further, as shown in FIG. 6, the other end of the data signal pattern 27 is electrically connected with a magnetic head signal terminal 28 which is formed in the connecting terminal part 19. In other words, the data signal pattern 27 electrically connects the signal terminal 16 with the magnetic head signal terminal 28. In this embodiment, the data signal pattern 27 is not formed in the data signal layer 23 of the first folding back part 4c and the second folding back part 4d.

The disconnection detecting signal layer 24 is formed with disconnection detecting signal patterns 29 and 30 (see FIG. 6). The disconnection detecting signal patterns 29 and 30 transmit a disconnection detecting signal for detecting that the disconnection sensing signal patterns 29 and 30 themselves are disconnected in order to prevent attachment of a signal line for skimming to the data signal pattern 27. In this embodiment, the disconnection detecting signal pattern 29 on an input side for a disconnection detecting signal and the disconnection detecting signal pattern 30 on an output side for the disconnection detecting signal are formed in the disconnection detecting signal layer 24. The disconnection detecting signal pattern 29 in this embodiment is a first disconnection detecting signal pattern and the disconnection detecting signal pattern 30 is a second disconnection detecting signal pattern.

As shown in FIG. 6, one end of the disconnection detecting signal pattern 29 is electrically connected with the land 21 of the second folding back part 4d and the other end of the disconnection detecting signal pattern 29 is electrically connected with the disconnection detection terminal 31 which is formed in the connecting terminal part 19. One end of the disconnection detecting signal pattern 30 is electrically connected with the land 20 of the first folding back part 4c and the other end of the disconnection detecting signal pattern 30 is electrically connected with the disconnection detection terminal 32 which is formed in the connecting terminal part 19. In accordance with an embodiment of the present invention, it may be structured that one end of the disconnection detecting signal pattern 29 is connected with the land 20 and one end of the disconnection detecting signal pattern 30 is connected with the land 21.

As described above, the land 20 and the land 21 are soldered with each other and thus the disconnection detection terminal 31 and the disconnection detection terminal 32 are electrically connected with each other through the disconnection detecting signal patterns 29 and 30 and the lands 20 and 21. In this embodiment, when a disconnection detecting signal inputted from the host device through the disconnection detection terminal 31 is not returned to the host device through the disconnection detection terminal 32, it is detected that the disconnection detecting signal patterns 29 and 30 are disconnected. As described above, in this embodiment, the lands 20 and 21 connect the disconnection detecting signal pattern 29 with the disconnection detecting signal pattern 30 and, as a result, the disconnection detecting signal patterns 29 and 30 are operated.

Further, when the flexible cable 4 is detached from the connector provided in the host device, a disconnection detecting signal is not inputted into the flexible cable 4 from the host device and, as a result, the disconnection detecting signal is not returned to the host device. Therefore, in this embodiment, detachment of the flexible cable 4 from the connector is detected by utilizing the disconnection detecting signal patterns 29 and 30. In other words, the disconnection detecting signal patterns 29 and 30 also function to detect detachment of the flexible cable 4 from the connector. In this embodiment, the disconnection detecting signal patterns 29 and 30 are formed to be folded multiple times in the widthwise direction of the flexible cable 4 and are formed in a substantially net shape as a whole.

Further, the disconnection detecting signal layer 24 is formed with a short circuit detecting signal pattern 33 (see FIG. 6). The short circuit detecting signal pattern 33 transmits a short circuit detecting signal for detecting a short circuit between the disconnection detecting signal patterns 29 and 30 and the short circuit detecting signal pattern 33. As shown in FIG. 6, one end of the short circuit detecting signal pattern 33 is electrically connected with the short circuit detection terminal 34 which is formed in the connecting terminal part 19 and the other end of the short circuit detecting signal pattern 33 is electrically connected with the short circuit detection terminal 35 which is formed in the connecting terminal part 19. In this embodiment, the disconnection detecting signal layers 24 of the first folding back part 4c and the second folding back part 4d are also formed with the disconnection detecting signal patterns 29 and 30 and the short circuit detecting signal pattern 33.

(Principal Effects in this Embodiment)

As described above, in this embodiment, the turning back part 4b is folded and fixed to the terminal connecting part 4a so as to cover the terminal connecting part 4a where the through holes 18 into which the signal terminals 16 are inserted are formed. Therefore, even when the other end sides of the signal terminals 16 are protruded from the head case 15 of the magnetic head 3, the signal terminals 16 are covered by the turning back part 4b. Accordingly, in this embodiment, attachment of a signal line for skimming to the signal terminal 16 is prevented. Further, in this embodiment, the front face and the rear face of the data signal layer 23 are covered by the disconnection detecting signal layers 24 and thus, when a criminal is trying to attach a signal line for skimming to the data signal pattern 27, the criminal act is detected by utilizing the disconnection detecting signal patterns 29 and 30. Therefore, in this embodiment, attachment of a signal line for skimming to the data signal pattern 27 is prevented. As described above, in this embodiment, attachment of a signal line for skimming to the signal terminal 16 and the data signal pattern 27 is prevented and thus skimming can be prevented.

Further, in this embodiment, even when the other end sides of the signal terminals 16 are protruded from the head case 15, skimming is prevented. Therefore, even when a normal magnetic head 3 (in other words, a general purpose magnetic head 3) in which the other end sides of the signal terminals 16 are protruded from the head case 15 is used, skimming is prevented. Therefore, in this embodiment, cost of the magnetic head 3 can be reduced. Further, in this embodiment, even when the other end sides of the signal terminals 16 are protruded from the head case 15, skimming is prevented. Therefore, connecting work of the flexible cable 4 with the signal terminals 16 is easy while skimming is prevented. Further, in this embodiment, even when the other end sides of the signal terminals 16 are protruded from the head case 15, skimming is prevented and thus, in a case that a special magnetic head 3 which is not a general purpose product is used, the size of the head case 15 can be reduced to miniaturize the magnetic head 3.

In this embodiment, the turning back part 4*b* connected with the terminal connecting part 4*a* in the longitudinal direction of the flexible cable 4 is covered by the first folding back part 4*c* connected with the terminal connecting part 4*a* on one end side in the widthwise direction of the flexible cable 4, and a part of the first folding back part 4*c* is covered by the second folding back part 4*d* which is connected with the terminal connecting part 4*a* on the other end side in the widthwise direction of the flexible cable 4. Therefore, end faces of the terminal connecting part 4*a* and end faces of the turning back part 4*b* are covered by the first folding back part 4*c* and the second folding back part 4*d* on both sides in the widthwise direction of the flexible cable 4. Accordingly, in this embodiment, a signal line for skimming is prevented from being attached to the signal terminal 16 from a space between the end face of the terminal connecting part 4*a* and the end face of the turning back part 4*b* on both sides in the widthwise direction of the flexible cable 4.

Especially in this embodiment, the second folding back part 4*d* is fixed to the first folding back part 4*c* by soldering and thus, the second folding back part 4*d* is not easily torn off from the first folding back part 4*c*. Therefore, in this embodiment, a signal line for skimming is effectively prevented from being attached to the signal terminal 16 from a space between the end face of the terminal connecting part 4*a* and the end face of the turning back part 4*b* on both sides in the widthwise direction of the flexible cable 4.

In this embodiment, the disconnection detecting signal pattern 29 and the disconnection detecting signal pattern 30 are connected with each other through the land 20 of the first folding back part 4*c* and the land **21* of the second folding back part 4*d* which are soldered and fixed to each other. Therefore, when the second folding back part 4*d* is torn off from the first folding back part 4*c*, disconnection of the disconnection detecting signal patterns 29 and 30 is detected. Accordingly, in this embodiment, a criminal act by a criminal is detected at an early stage.

In this embodiment, the disconnection detecting signal patterns 29 and 30 are formed to be folded multiple times in the widthwise direction of the flexible cable 4 and are formed in a substantially net shape as a whole. Therefore, when the disconnection detecting signal layer 24 is cut for trying to attach a signal line for skimming to the data signal pattern 27, the disconnection detecting signal patterns 29 and 30 are easily disconnected. Accordingly, in this embodiment, a criminal act by a criminal is easily detected.

In this embodiment, the disconnection detecting signal layer 24 is formed with the short circuit detecting signal pattern 33 which transmits a short circuit detecting signal for detecting a short circuit between the disconnection detecting signal patterns 29 and 30 and the short circuit detecting signal pattern 33. Therefore, when a criminal performs a certain act on the disconnection detecting signal patterns 29 and 30 so that a disconnection detecting signal does not function, the criminal act is detected by the short circuit detecting function of the short circuit detecting signal pattern 33. In other words, in this embodiment, a criminal act by a criminal is easily detected.

In this embodiment, detachment of the flexible cable 4 from the connector is detected by utilizing the disconnection detecting signal patterns 29 and 30. Therefore, when the flexible cable 4 is pulled off from the connector in order that a criminal tries to attach a signal line for skimming to the data signal pattern 27, the criminal act is detected by the detachment detecting function of the disconnection detecting signal patterns 29 and 30. Accordingly, in this embodiment, the criminal act by a criminal is detected at an early stage.

Other Embodiments

Although the present invention has been shown and described with reference to a specific embodiment, various changes and modifications will be apparent to those skilled in the art from the teachings herein.

In the embodiment described above, the turning back part 4*b* is folded to cover the terminal connecting part 4*a* and is fixed to the terminal connecting part 4*a*. However, the present invention is not limited to this embodiment. For example, it may be structured that the first folding back part 4*c* is folded to cover the terminal connecting part 4*a* and is fixed to the terminal connecting part 4*a*. In this case, it may be structured that the second folding back part 4*d* is folded to cover the first folding back part 4*c* and is fixed to the first folding back part 4*c*, and that the turning back part 4*b* is folded to cover the first folding back part 4*c* and the second folding back part 4*d* and is fixed to the first folding back part 4*c* and the second folding back part 4*d*. Alternatively, it may be structured that the turning back part 4*b* is folded to cover the first folding back part 4*c* and is fixed to the first folding back part 4*c*, and that the second folding back part 4*d* is folded to cover the turning back part 4*b* and is fixed to the turning back part 4*b*. Further, in this case, it may be structured that the turning back part 4*b* is not folded. In this embodiment, the first folding back part 4*c* in this case is a terminal covering part which is folded to cover the terminal connecting part 4*a* and is fixed to the terminal connecting part 4*a*.

In the embodiment described above, the second folding back part 4*d* is folded to cover the first folding back part 4*c* and is fixed to the first folding back part 4*c*. However, the present invention is not limited to this embodiment. For example, it may be structured that the first folding back part 4*c* is formed so that the second folding back part 4*d* is not overlapped with the first folding back part 4*c*, and that the first folding back part 4*c* and the second folding back part 4*d* are folded and fixed to the turning back part 4*b* so that the turning back part 4*b* is covered by the first folding back part 4*c* and the second folding back part 4*d*. The first folding back part 4*c* and the second folding back part 4*d* in this case are an outer side covering part which is folded to cover the turning back part 4*b*, i.e., a terminal covering part and is fixed to the turning back part 4*b*.

In the embodiment described above, the flexible cable 4 is provided with the first folding back part 4*c* and the second folding back part 4*d*. However, the flexible cable 4 may be provided with no first folding back part 4*c* and no second folding back part 4*d*. In this case, the structure of the flexible cable 4 is simplified. Further, in the embodiment described above, the short circuit detecting signal pattern 33 is formed in the disconnection detecting signal layer 24 but no short circuit detecting signal pattern 33 may be formed in the disconnection detecting signal layer 24.

In the embodiment described above, the magnetic head 3 is a magnetic head for reproducing data which performs reading of magnetic data recorded on a card 2. However, the present invention is not limited to this embodiment. For example, the magnetic head 3 may be a magnetic head for recording data which performs writing of magnetic data on a card 2 or may be a magnetic head for reproducing and recording data which performs reading of magnetic data and writing of magnetic data.

In the embodiment described above, the medium processing device 1 is a dip type card reader in which a card 2 is manually inserted into the inside of the device and pulled out from the inside of the device by a user. However, the present invention is not limited to this embodiment. For example, the medium processing device to which at least an embodiment of the structure of the present invention is applied may be a so-called swipe type card reader in which reading of magnetic data on a card 2 is performed while the card 2 is manually moved along a card passage which is formed in a groove shape whose depth is shorter than a width in a short widthwise direction of the card 2. Alternatively, the medium processing device may be a card feeding type card reader which is provided with a card feeding mechanism. Further, the medium processing device to which the structure of at least an embodiment of the present invention is applied may be a device other than the card reader.

In the embodiment described above, the flexible cable 4 is connected with the magnetic head 3 as a recording and reproducing head but the flexible cable 4 may be connected with a recording and reproducing head other than the magnetic head 3 which performs writing of data and/or reading of data. For example, the flexible cable 4 may be connected with an optical head (optical sensor) which performs reading of bar codes recorded on a recording medium such as a card 2. In this case, the cost of the optical head is reduced while preventing illegal acquisition of bar code data and connecting work of the flexible cable 4 to the signal terminal of the optical head is easily performed.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A medium processing device for use with a recording medium, the medium processing device comprising:
   a recording and reproducing head configured to read data recorded in the recording medium or write data to the recording medium; and
   a flexible cable which is connected with the recording and reproducing head;
   wherein the flexible cable is formed in a multilayer structure comprising:
      a data signal layer which is formed with a data signal pattern transmitting data signal from the recording and reproducing head and/or data signal to the recording and reproducing head; and
      disconnection detecting signal layers which cover a front face and a rear face of the data signal layer and are formed with a disconnection detecting signal pattern transmitting a disconnection detecting signal for detecting disconnection of the disconnection detecting signal pattern; and
   wherein the flexible cable comprises:
      a terminal connecting part which is formed with a through hole into which a signal terminal of the recording and reproducing head is inserted; and
      a terminal covering part which is folded to cover the terminal connecting part and is fixed to the terminal connecting part.

2. The medium processing device according to claim 1, wherein
   the flexible cable is formed in a long and thin elongated shape in one direction, and
   the terminal covering part is formed so as to be connected with the terminal connecting part in a longitudinal direction of the flexible cable.

3. The medium processing device according to claim 2, wherein the flexible cable comprises an outer side covering part which is formed so as to be connected with the terminal connecting part in a widthwise direction of the flexible cable and is folded to cover the terminal covering part and is fixed to the terminal covering part.

4. The medium processing device according to claim 3, wherein
   the flexible cable comprises a second outer side covering part which covers the outer side covering part,
   the outer side covering part is formed so as to be connected with one end of the terminal connecting part in the widthwise direction of the flexible cable, and
   the second outer side covering part is formed so as to be connected with the other end of the terminal connecting part in the widthwise direction of the flexible cable and is folded to cover the outer side covering part and is fixed to the outer side covering part.

5. The medium processing device according to claim 4, wherein the second outer side covering part is fixed to the outer side covering part by soldering.

6. The medium processing device according to claim 5, wherein
   the disconnection detecting signal layer is formed with a first disconnection detecting signal pattern, which is a disconnection detecting signal pattern on an input side for the disconnection detecting signal, and a second disconnection detecting signal pattern which is a disconnection detecting signal pattern on an output side for the disconnection detecting signal,
   the outer side covering part and the second outer side covering part are formed with lands for connecting the first disconnection detecting signal pattern with the second disconnection detecting signal pattern,
   the second outer side covering part is fixed to the outer side covering part by soldering the land of the second outer side covering part to the land of the outer side covering part, and
   the first disconnection detecting signal pattern and the second disconnection detecting signal pattern are connected with each other by soldering the land of the second outer side covering part to the land of the outer side covering part.

7. The medium processing device according to claim 1, wherein
   the flexible cable is formed in a long and thin elongated shape in one direction, and
   the disconnection detecting signal pattern is formed to be folded multiple times in a widthwise direction of the flexible cable.

8. The medium processing device according to claim 1, wherein the disconnection detecting signal layer is
   formed with a short circuit detecting signal pattern transmitting a short circuit detecting signal for detecting a short circuit between the disconnection detecting signal pattern and the short circuit detecting signal pattern.

9. The medium processing device according to claim 1, further comprising a connector with which the flexible cable is connected,
   wherein the disconnection detecting signal pattern functions to detect detachment of the flexible cable from the connector.

10. The medium processing device according to claim 1, wherein the recording and reproducing head is a magnetic head which performs reading of magnetic data and/or writing of magnetic data.

11. A flexible cable which is structured in a multilayer structure, the flexible cable comprising:
   a data signal layer which is formed with a data signal pattern configured to transmit a data signal;
   disconnection detecting signal layers which cover a front face and a rear face of the data signal layer and are formed with a disconnection detecting signal pattern transmitting a disconnection detecting signal for detecting disconnection of the disconnection detecting signal pattern;
   a terminal connecting part which is formed with a through hole into which a signal terminal of a recording and reproducing head, which performs reading of data recorded in a recording medium and/or writing of data to the recording medium, is inserted; and
   a terminal covering part which is folded to cover the terminal connecting part and is fixed to the terminal connecting part.

* * * * *